(12) United States Patent
Kobayashi et al.

(10) Patent No.: US 8,425,175 B2
(45) Date of Patent: Apr. 23, 2013

(54) PART-DELIVERY APPARATUS AND METHOD FOR THE SAME

(75) Inventors: Makoto Kobayashi, Kawasaki (JP); Tsutomu Miyamoto, Kawasaki (JP); Kazuyoshi Akiike, Kawasaki (JP); Takeshi Kurumizawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 463 days.

(21) Appl. No.: 12/153,154

(22) Filed: May 14, 2008

(65) Prior Publication Data

US 2009/0041562 A1 Feb. 12, 2009

(30) Foreign Application Priority Data

Aug. 9, 2007 (JP) .................................. 2007-208386

(51) Int. Cl.
*B25J 15/06* (2006.01)
*B65G 47/91* (2006.01)

(52) U.S. Cl.
USPC ..................... 414/752.1; 294/65; 414/222.04; 414/226.04

(58) Field of Classification Search ............. 414/222.04, 414/226.04, 404, 416.02, 752.1
See application file for complete search history.

(56) References Cited

U.S. PATENT DOCUMENTS

| | | | | |
|---|---|---|---|---|
| 5,006,028 A | * | 4/1991 | Jackson | 414/222.04 |
| 5,261,265 A | * | 11/1993 | Nichols | 72/420 |
| 5,501,568 A | * | 3/1996 | Ono | 414/416.02 |
| 5,579,572 A | * | 12/1996 | Kashiwagi et al. | 29/836 |
| 5,953,812 A | * | 9/1999 | Ferrante | 29/714 |
| 6,104,204 A | * | 8/2000 | Hayama et al. | 324/750.08 |
| 6,139,078 A | * | 10/2000 | Bodiker et al. | 294/64.1 |
| 6,153,887 A | | 11/2000 | Furuta | |
| 6,359,646 B1 | | 3/2002 | Kanauchi | |
| 6,748,649 B2 | * | 6/2004 | Okuda et al. | 29/740 |
| 6,851,914 B2 | * | 2/2005 | Hirata | 414/627 |
| 6,877,215 B2 | * | 4/2005 | Pfeiffer | 29/729 |
| 7,354,085 B2 | * | 4/2008 | Mori et al. | 294/64.1 |
| 7,546,678 B2 | * | 6/2009 | Asai et al. | 29/743 |
| 2002/0088113 A1 | * | 7/2002 | Hwang | 29/743 |

(Continued)

FOREIGN PATENT DOCUMENTS

| | | |
|---|---|---|
| CN | 1668178 A | 9/2005 |
| JP | 59-134628 | 8/1984 |

(Continued)

OTHER PUBLICATIONS

Chinese Office Action issued Apr. 1, 2010 in corresponding Chinese Patent Application 200810108318.6.

(Continued)

*Primary Examiner* — James Keenan
(74) *Attorney, Agent, or Firm* — Fujitsu Patent Center

(57) ABSTRACT

According to an aspect of an embodiment, there is provided a part-delivery apparatus which transports a part to a designated part-delivery position by drawing the part onto a head by suction pressure at a designated part-suction position, and which releases the part at the part-delivery position by stopping application of the suction pressure. The apparatus includes: a compliance mechanism for allowing movement of the head in a horizontal plane; an upper-side positioning unit for positioning the head in the part-suction position by responding to an upward movement of the head; and a lower-side positioning unit for positioning the head in the part-delivery position by responding to the downward movement of the head.

8 Claims, 7 Drawing Sheets

U.S. PATENT DOCUMENTS

| | | | |
|---|---|---|---|
| 2004/0146383 A1* | 7/2004 | Behnke | 414/416.02 |
| 2004/0197183 A1* | 10/2004 | Cho et al. | 414/752.1 |
| 2005/0177998 A1 | 8/2005 | Fukushima et al. | |
| 2006/0103151 A1* | 5/2006 | Usui et al. | 294/64.1 |
| 2007/0020066 A1* | 1/2007 | Woo et al. | 414/222.04 |

FOREIGN PATENT DOCUMENTS

| | | |
|---|---|---|
| JP | 63-203515 A | 8/1988 |
| JP | 63-221945 A | 9/1988 |
| JP | 2-156488 | 6/1990 |
| JP | 2-243228 A | 9/1990 |
| JP | 10-68759 | 3/1998 |
| JP | 11-285925 | 10/1999 |
| JP | 2003-298287 | 10/2003 |

OTHER PUBLICATIONS

Japanese Office Action mailed Jun. 19, 2012 for corresponding Japanese Application No. 2007-208386, with Partial English-language Translation.

* cited by examiner

PART-DELIVERY APPARATUS AND METHOD FOR THE SAME

BACKGROUND

1. Field

The present art relates to an apparatus and method for delivering a part to a designated position by holding it on a head by suction pressure.

2. Description of the Related Art

An apparatus that utilizes pneumatic pressure is used to deliver a part to a part pallet or the like. Such a part-delivery apparatus transports a part by holding it by the tip of a head of a device by drawing air using an ejector, and places the part onto a pallet or the like by stopping the drawing of the air at a designated position on the pallet or the like.

It is also known to use a feeder as an apparatus for successively feeding parts in an orderly aligned manner. The parts from the feeder are taken one by one by an operator and arranged on a tray to match the product shape, and then the parts are transported by being held by the heads of the part-delivery apparatus.

The parts successively received from the feeder in an orderly aligned manner are held onto the heads at the receiving positions and transported in an orderly arranged condition in order to save the operator the trouble of arranging the parts on the tray. However, if the parts placed on a part pallet or the like are not arranged orderly there arises a need to correct the part-delivery positions effected by the heads. To accomplish this, the head unit must be equipped with a complex, high-cost mechanism for correcting the delivery positions.

On the other hand, a pressure sensor for detecting a pressure change is mounted in a suction pipe passage in order to check the presence or absence of a part on the tip of the head (i.e., whether the part is held by the head or has been released). However, if part is not correctly detected for example, even when the ejector is activated to draw the part onto the head, but the part is actually held by the head, the pressure sensor may not turn on (indicating the fixedly held condition) because of air leakage. When the ejector is deactivated to release the part, and the pressure sensor has turned off (indicating the released condition), the part may remain held by the head. Since it is not possible to accurately detect whether the part has been released or not, a pusher for forcefully releasing the part is attached.

Japanese Unexamined Patent Publication No. H02-156488, a prior art document related to the present art, discloses a magnetic head manufacturing method and apparatus in which positioning is achieved by a lowed driver hitting a tapered portion of a female screw (product side). Further, Japanese Unexamined Patent Publication No. H11-285925 discloses a part-mounting apparatus in which a suction nozzle having a detachable mounting head is equipped with an optical fiber bundle, which recognizes the mounting position of the part by examining a captured image transmitted through an optical guide path comprising the optical fiber bundle.

On the other hand, Japanese Unexamined Patent Publication No. S59-134628 discloses an automatic screw tightening apparatus wherein when a screw chuck holding a screw moves down, the chamfer portion of the screw contacts the chamfer portion of the screw hole thereby correcting any positional displacement between them, and after the screw is tightened, the chuck moves upward and returns to the original position by the restoring force of a spring. Further, Japanese Unexamined Patent Publication No. H10-68759 discloses a suction-held object detecting apparatus for detecting a suction-held object by using a light-receiving sensor mounted within a transport arm and a light-emitting sensor mounted below a stage.

SUMMARY

According to an aspect of an embodiment, there is provided a part-delivery apparatus which transports a part to a designated part-delivery position by drawing the part onto a head by suction pressure at a designated part-suction position, and which releases the part at the part-delivery position by stopping application of the suction pressure, the apparatus comprising: a compliance mechanism for allowing movement of the head in a horizontal plane; a first positioning unit for positioning the head in the part-suction position by responding to one of upward and downward movements of the head; and a second positioning unit for positioning the head in the part-delivery position by responding to the other one of the upward and downward movements of the head.

BRIEF DESCRIPTION OF THE DRAWINGS

The features and advantages of the present art will be apparent from the following description with reference to the accompanying drawings, in which.

DESCRIPTION OF THE PREFERRED EMBODIMENTS

Figure 1:
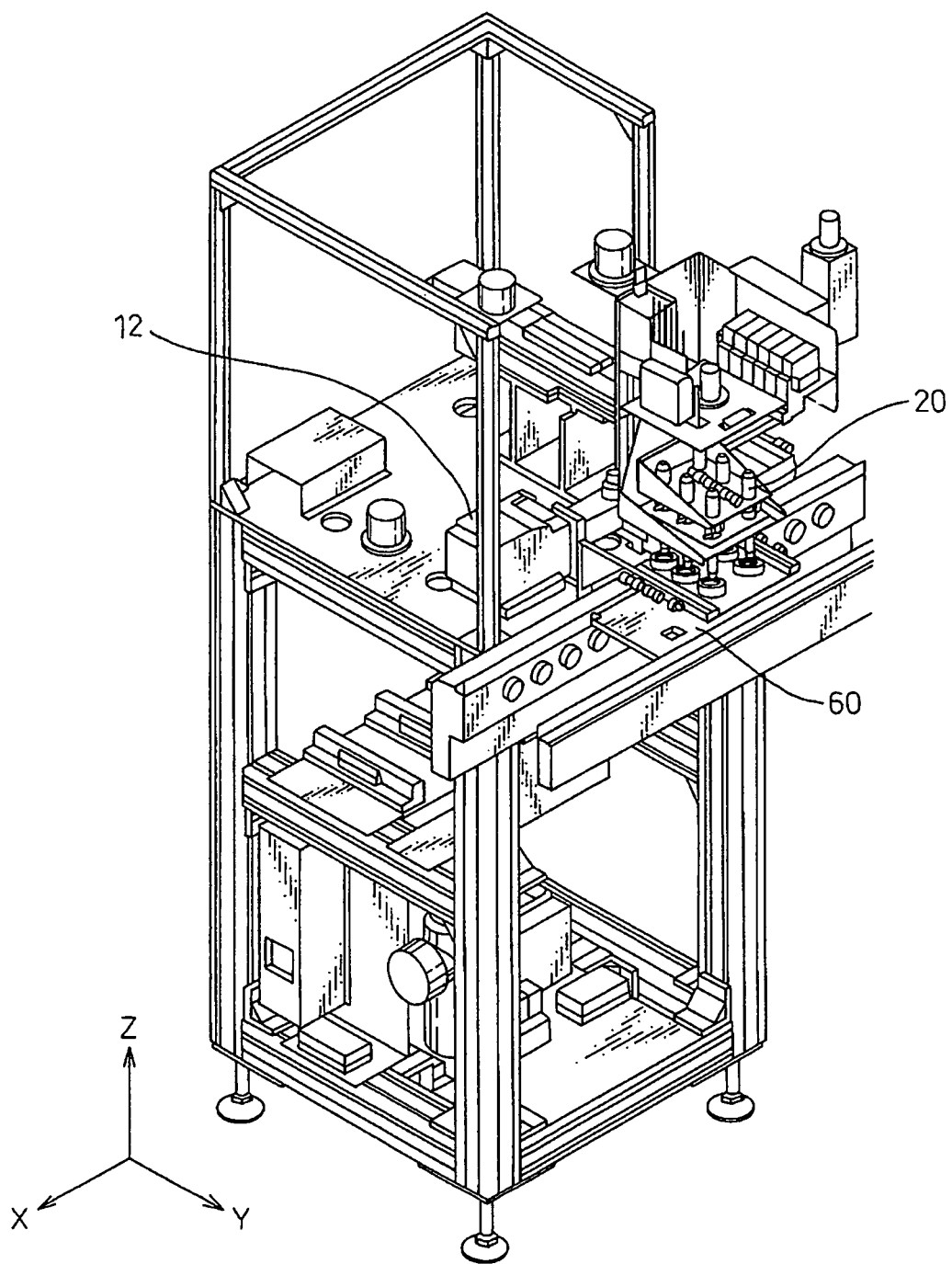
FIG. 1 is a perspective view showing the general construction of a part-delivery apparatus according to one embodiment of the present art.
Figure 2:
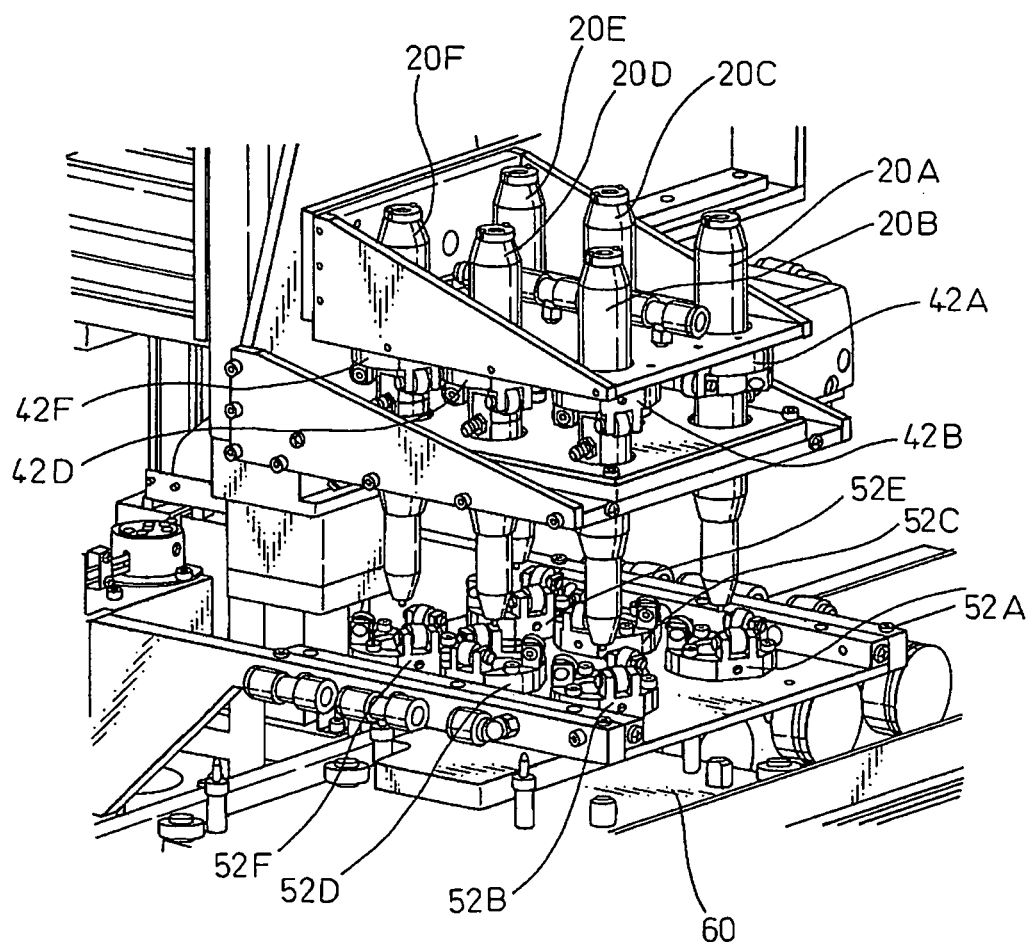
FIG. 2 is a perspective view showing the construction of a head assembly and its adjacent portions.
Figure 3:
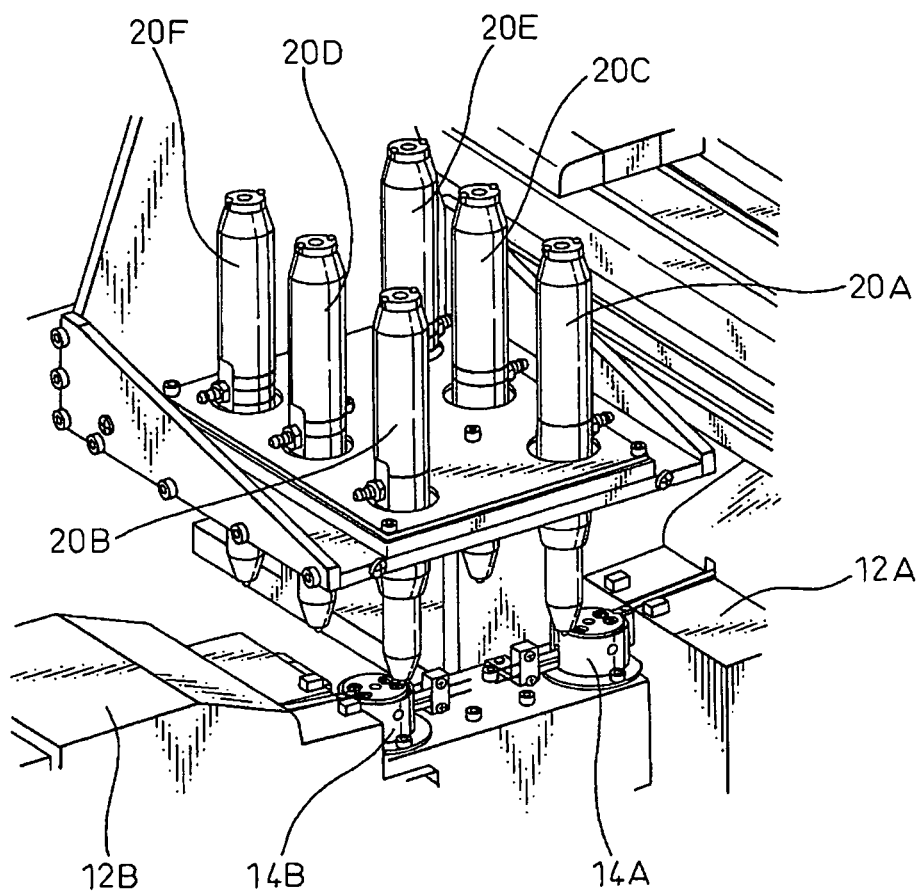
FIG. 3 is a perspective view showing the head assembly and its adjacent portions when the head assembly is moved to the feeder position.

The embodiments of the present art will be described below with reference to the accompanying drawings. FIG. 1 is a perspective view showing the general construction of a part-delivery apparatus according to one embodiment of the present art, FIG. 2 is a perspective view showing the construction of a head assembly and its adjacent portions, and FIG. 3 is a perspective view showing the head assembly and its adjacent portions when the head assembly is moved to the feeder position. The part-delivery apparatus shown is constructed so that screws as parts fed from two feeders 12 (respectively indicated by 12A and 12B) are held by suction onto six heads 20 (respectively indicated by 20A, 20B, . . . , 20F) and the six screws held on the respective heads are transported to a part pallet 60 and delivered to designated part-delivery positions on the part pallet 60.

Heads 20 are arranged in two rows in the X-axis direction and three rows in the Y-axis direction shown in FIG. 1. The mechanism including head assembly 20 is movable in the Y-axis direction. Head assembly 20 is constructed so that the six heads together can be moved up and down along the Z-axis direction. Further, as shown in FIG. 2, the mechanism including head assembly 20 is provided with six upper-side positioning units 42 (respectively indicated by 42A, 42B, ..., 42F) and six lower-side positioning units 52 (respectively indicated by 52A, 52B, ..., 52F) in corresponding relationship to the six heads 20.

Figure 4:
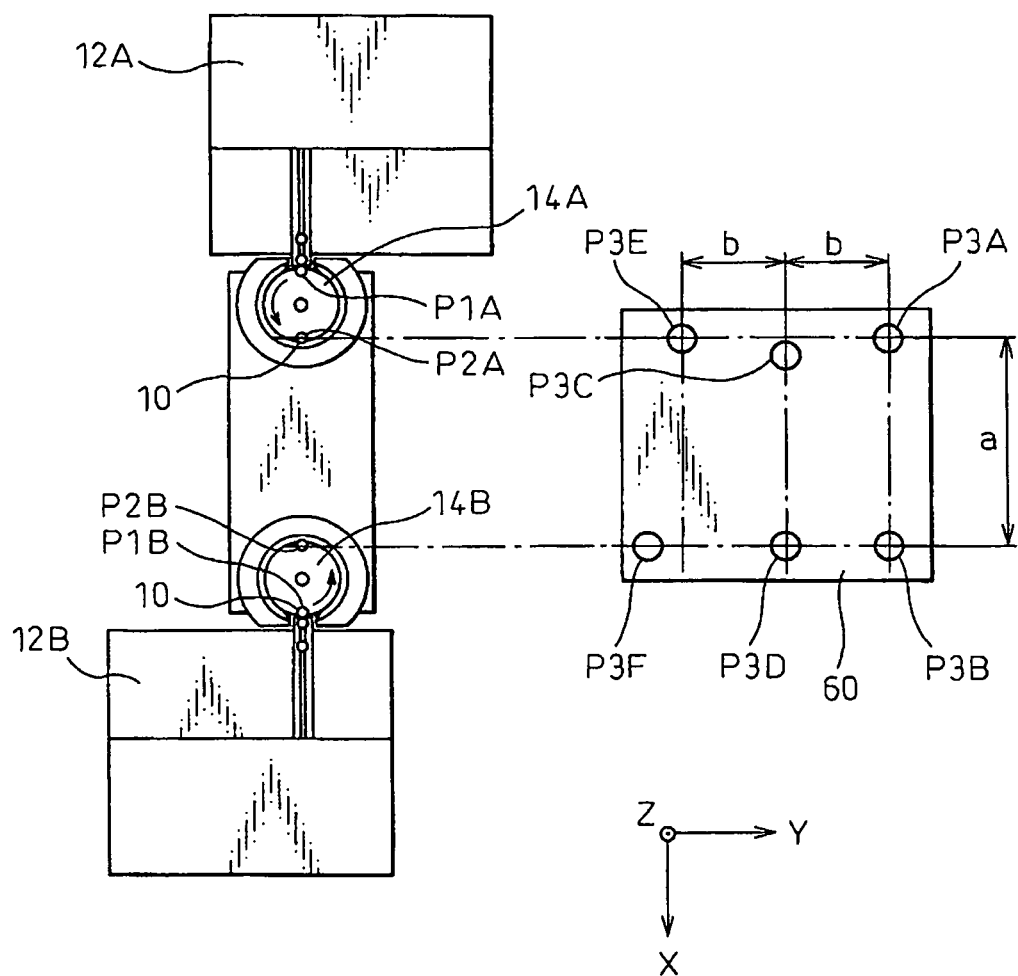
FIG. 4 is a plan view showing part-delivery paths from feeders to a part pallet.

FIG. 4 is a plan view showing part-delivery paths from the feeders 12A and 12B to part pallet 60 (as viewed from the direction opposing the Z axis in FIG. 1). Parts (screws) 10 fed out of feeder 12A in an orderly aligned manner are each loaded at a part-receiving position P1A directly into a cartridge 14A serving as a loading device. As each part 10 is loaded, cartridge 14A rotates 180 degrees thereby automatically transporting part 10 to a part-suction position P2A where corresponding head 20 can receive part 10 by suction. In like manner, parts 10 fed out of feeder 12B are each loaded at a part-receiving position P1B into a cartridge 14B and transported to a part-suction position P2B.

In this way, since each part 10 fed out of feeder 12 is loaded into cartridge 14 (14A or 14B) and automatically transported to the position where corresponding head 20 can receive part 10 by suction, not only can the operator be saved the trouble of rearranging the parts on a tray, but also the need for such a tray can be eliminated. Besides, while cartridge 14 is automatically transporting one part 10 to the part-suction position, feeder 12 can feed out next part 10 in an orderly aligned manner, which serves to shorten the takt time.

Then, head 20A receives part 10 by suction at part-suction position P2A and transports it along the Y-axis direction for delivery to a part-delivery position P3A on pallet 60. In like manner, heads 20B, 20C, 20D, 20E, and 20F deliver parts 10 to corresponding part-delivery positions P3B, P3C, P3D, P3E, and P3F.

Six heads 20 transport parts 10 by arranging them with spacing "a" along the X-axis direction and spacing "b" along the Y-axis direction as shown in FIG. 4. However, on pallet 60, part-delivery position P3C is displaced in the X-axis direction and part-delivery position P3F in the Y-axis direction relative to the respective spacings so as to match the positions of the parts on the product. Therefore, in the part-delivery apparatus of the present art, heads 20 are not fixed, and a mechanism is provided that automatically accommodates the displacements between the part-suction positions and the part-delivery positions by positioning heads 20 by moving them up and down so as to pass through respective positioning units 42 and 52.

Figure 5:
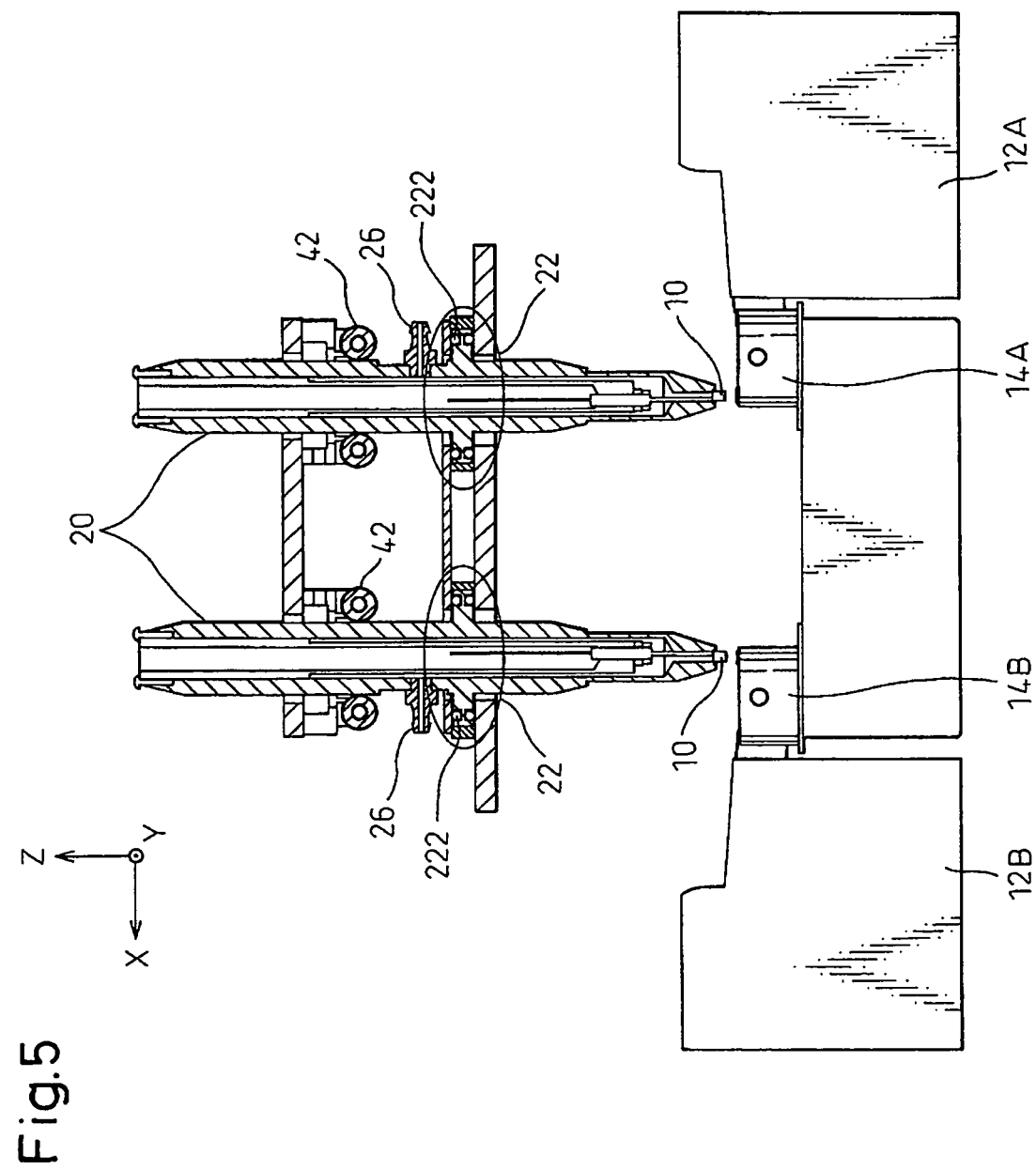
FIG. 5 is a diagram explaining the positioning of the heads at part-suction positions.
Figure 6:
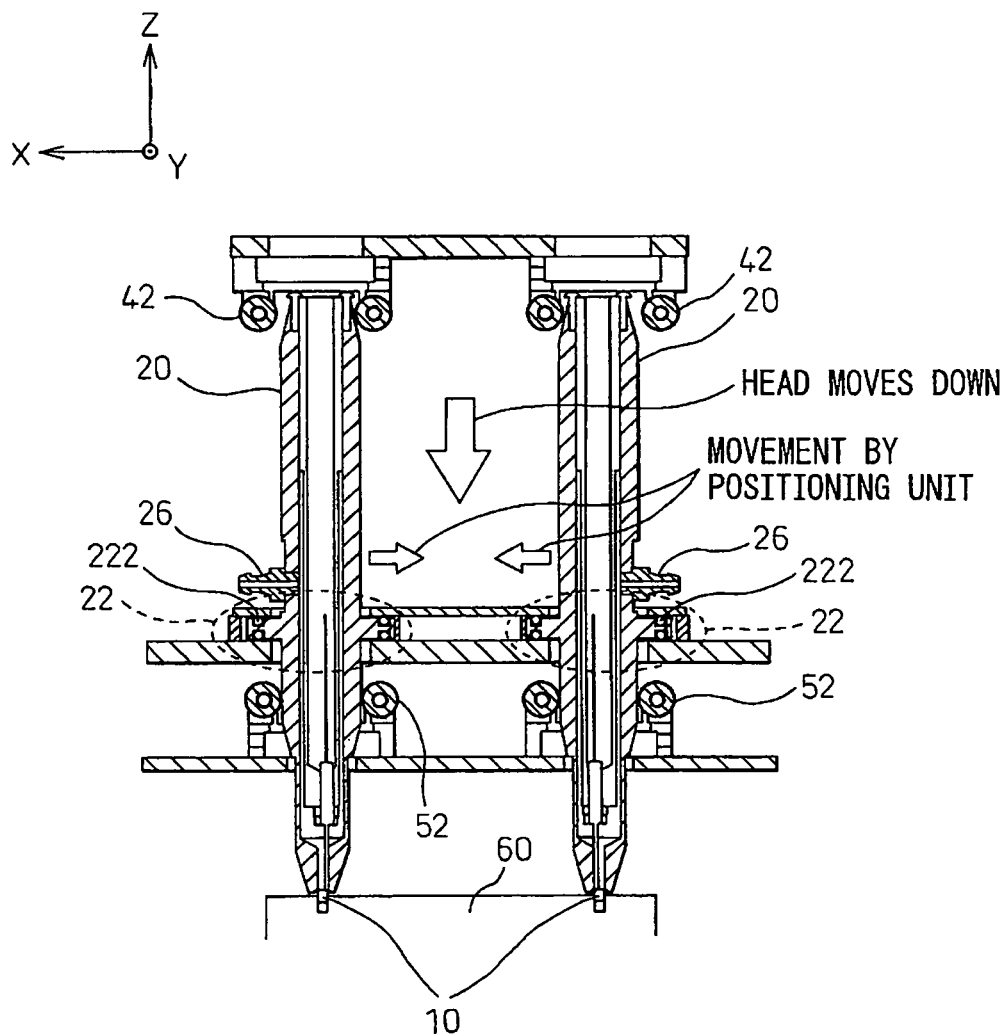
FIG. 6 is a diagram explaining the positioning of the heads at part-delivery positions.

FIG. 5 is a diagram for explaining the positioning of heads 20 at the part-suction positions, and FIG. 6 is a diagram for explaining the positioning of heads 20 at the part-delivery positions, both viewed from the direction opposing the Y axis. Each head 20 is provided at its center with a compliance mechanism 22 for allowing the movement of head 20 in a horizontal plane. Compliance mechanism 22 has a plurality of steel balls between two plates, and with these steel balls 222 rolling, head 20 is allowed to move in the X- and Y-axis directions within a predefined range.

As shown in FIG. 5, when taking part 10 from cartridge 14, head 20 moves up passing through upper-side positioning unit 42 in contacting fashion and is thus positioned with respect to the part-suction position. After that, the ejector (not shown) connected to a part-suction coupling 26 is activated to draw part 10 onto head 20.

Head 20 with part 10 thus held thereon moves to a position above pallet 60. Then, as shown in FIG. 6, head 20 moves down passing through lower-side positioning unit 52 in contacting fashion and is thus positioned with respect to part-delivery position. After that, the ejector (not shown) connected to part-suction coupling 26 is deactivated to deliver part 10 onto pallet 60.

In this way, when head 20 moves up and down passing through the respective positioning units, head 20 is fixed in a prescribed position by contacting the positioning units and thus positioned in place. Head 20 need only be made to contact each positioning unit so that head 20 can be fixed in a prescribed position for example, the positioning unit may be made to abut head 20 from four side or at a plurality of positions. Head 20 and its positioning units 42 and 52 are constructed so that upper-side positioning unit 42 and lower-side positioning unit 52 do not simultaneously act on head 20.

In the present embodiment, the heads are not fixed, but the positioning of each head is done by passing the head through the corresponding positioning units in contacting fashion accordingly. If there is a displacement between the position at which the part is drawn from the cartridge and the position at which the part is delivered to the pallet, there is no need to provide an actuator for correcting the head position. Furthermore, since by just moving the head in one axis direction (Z-axis direction), the positioning along the other two axis directions (X-axis and Y-axis directions) can be accomplished, the control load can be reduced.

Further, since there is no need to rearrange the parts at some other location so as to match the spacing of the delivery positions, the takt time can be reduced. Moreover, if the product model is changed, such change can be handled by changing the mounting positions of the positioning units, which serves to significantly reduce cost.

Figure 7A:
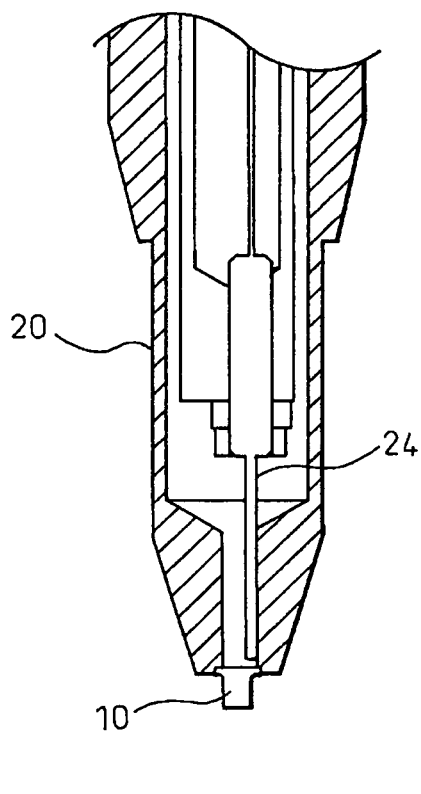
FIG. 7A is a diagram explaining how the condition of a part is detected at a part-suction position.
Figure 7B:
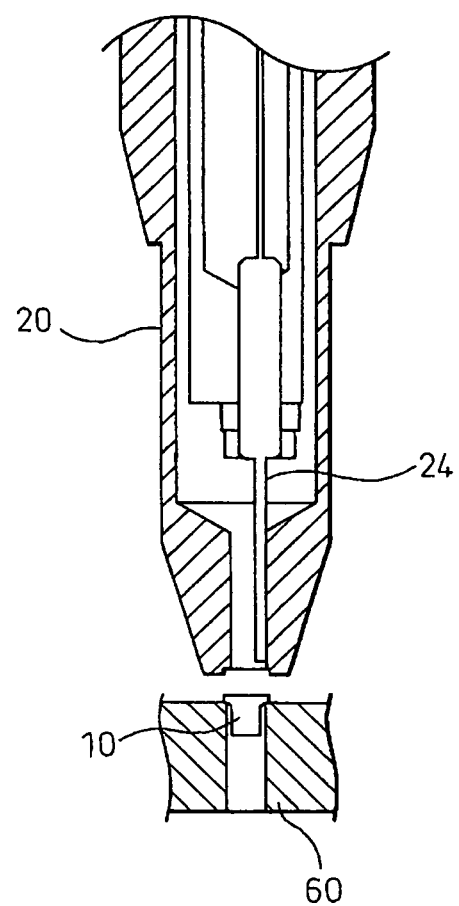
FIG. 7B is a diagram explaining how the condition of a part is detected at a part-delivery position.

FIGS. 7A and 7B are diagrams explaining how the condition of the part is detected at the part-suction and part-delivery positions, respectively. As shown in FIGS. 7A and 7B, an optical fiber sensor 24 is mounted inside the tip of head 20 on which part 10 is held by suction, and the condition of part 10 is detected by detecting reflected light and determining whether or not part 10 is held on the head tip.

The threshold value relating to the sensor amplifier output is changed between the part-suction position and the part-delivery position, and the condition of the part is detected at the respective positions. In other words, for the part-suction position, the threshold value relating to the sensor amplifier output is set so as to eliminate the possibility of erroneously determining that part 10 is not held on head 20 when part 10 is actually held on head 20 as shown in FIG. 7A. On the other hand, for the part-delivery position, the threshold value relating to the sensor amplifier output is set so as to eliminate the possibility of erroneously determining that part 10 is still held on head 20 when part 10 has been delivered to pallet 60 as shown in FIG. 7B.

For the part-delivery position, two threshold values may be set in order to discriminate three conditions, i.e., the condition in which part 10 remains held on head 20, the condition in which part 10 is placed on pallet 60, and the condition in which part 10 is neither on the tip of head 20 nor on pallet 60.

By detecting the condition of part 10 using optical fiber sensor 24 as described above, an erroneous detection can be prevented from occurring due to pressure variations within head 20, and the condition in which the part held on the head is not yet released can also be detected accurately. Furthermore, by changing the threshold value relating to the sensor amplifier output, it is possible to accurately detect the condition of the part at different positions such as the part-suction position and the part-delivery position. Since the part-released condition can be accurately detected in this manner, the need for a pusher for forcefully releasing the part can be eliminated, which also serves to reduce cost.

The art may be embodied in other specific forms. The present embodiment is therefore to be considered in all respects as illustrative and not restrictive, the scope of the art being indicated by the appended claims rather than by the foregoing description and all changes which come within the meaning and range of equivalency of the claims are therefore intended to be embraced therein.

What is claimed is:

1. A part-delivery apparatus which transports a part to a designated part-delivery position by drawing said part onto a head by a suction pressure at a designated part-suction position, and which releases said part at said part-delivery position by stopping application of said suction pressure, said apparatus comprising:
    a compliance mechanism having a plate with a compliance through-hole, the plate supporting said head inserted into the compliance through-hole to allow movement of said head in a horizontal plane within a predefined range of the compliance through-hole;
    a first positioning unit having a first through-hole, arranged on the upper side of the compliance mechanism, for fixing said head in said part-suction position by inserting said head into the first through-hole and contacting said head to the first positioning unit in response to an upward movement of said head; and
    a second positioning unit having a second through-hole, arranged on the lower side of the compliance mechanism, for fixing said head in said part-delivery position by removing said head from the first through-hole, inserting said head into the second through-hole to direct an end of the head through the second through-hole to the part-delivery position and contacting said head to the second positioning unit in response to a downward movement of said head, when the head fixed to the first positioning unit moves above the second positioning unit.

2. The part-delivery apparatus as claimed in claim 1, further comprising a cartridge for taking parts being successively fed out in an orderly aligned manner from a feeder, and for automatically transporting each of said parts to said part-suction position.

3. The part-delivery apparatus as claimed in claim 1, further comprising an optical fiber sensor, mounted inside said head, for detecting reflected light to determine whether or not a part is held on said head.

4. The part-delivery apparatus as claimed in claim 3, wherein a threshold value relating to a sensor amplifier output for said optical fiber sensor is changed between said part-suction position and said part-delivery position.

5. A part-delivery method for a part-delivery apparatus comprising a head for holding a part thereon by a suction pressure and for transporting said part from a part-suction position to a part-delivery position, and a compliance mechanism for allowing movement of said head in a horizontal plane within a predefined range, said method comprising:
    fixing said head in said part-suction position by inserting said head into a first through-hole of a first positioning unit arranged on the upper side of the compliance mechanism and contacting said head to the first positioning unit in response to an upward movement of said head; and
    fixing said head in said part-delivery position by removing said head from the first through-hole, inserting said head into a second through-hole of a second positioning unit arranged on the lower side of the compliance mechanism to direct an end of the head through the second through-hole to the part-delivery position and contacting said head to the second positioning unit in response to a downward movement of said head, when the head fixed to the first positioning unit moves above the second positioning unit;
    wherein the compliance mechanism has a plate with a compliance through-hole, the plate supporting said head inserted into the compliance through-hole to allow movement of said head in a horizontal plane within a predefined range of the compliance through-hole.

6. The part-delivery method as claimed in claim 5, further comprising, by using a cartridge, taking parts being successively fed out in an orderly aligned manner from a feeder and automatically transporting each of said parts to said part-suction position.

7. The part-delivery method as claimed in claim 5, further comprising, by using an optical fiber sensor mounted inside said head, detecting reflected light to determine whether or not a part is held on said head.

8. The part-delivery method as claimed in claim 7, wherein a threshold value relating to a sensor amplifier output for said optical fiber sensor is changed between said part-suction position and said part-delivery position.

* * * * *